Sept. 14, 1948.　　　W. R. HARRIS　　　2,449,475
REGULATING SYSTEM
Filed Sept. 7, 1944

WITNESSES:

INVENTOR
Walter R. Harris.
BY
　　ATTORNEY

Patented Sept. 14, 1948

2,449,475

UNITED STATES PATENT OFFICE 2,449,475

REGULATING SYSTEM

Walter R. Harris, Forest Hills, Pa., assignor to Westinghouse Electric Corporation, East Pittsburgh, Pa., a corporation of Pennsylvania Application September 7, 1944, Serial No. 552,993

11 Claims. (Cl. 322—23)

My invention relates to electric power systems, such as for marine propulsion drives, textile mill range drives, sugar mill grinding tandems, in which a load or motor circuit is fed from a variable speed alternator in order to permit operating at different current frequencies or motor speeds.

It is an object of my invention to provide such a system with means which maintain the volts per cycle output of the alternator at a predetermined magnitude, and which perform the regulating operation required for such maintenance with a high degree of accuracy and reliability and without activity or supervision by the operator. Another object, in conjunction with the foregoing, is to devise a regulating system for operation within wide ranges of speed or frequency adjustment in which the alternator volts per cycle output is automatically increased at reduced operating speeds so as to substantially compensate for the increased percentile resistance drop (IR drop) of the load circuit or drive motor at such lower speeds. An object, allied to those mentioned, is also to achieve such a regulation without the use of delicate regulator mechanisms or speed-responsive rheostat devices so as to create a rugged organization of minimum maintenance requirements.

In order to achieve these objects, I provide the variable speed alternator of the power system with a voltage controlling field winding and connect this winding to direct-current exciting means which include an amplifying regulating generator whose armature voltage determines the field excitation of the alternator and whose field is controlled by at least two oppositely acting component voltages in dependence upon the alternator frequency and voltage, respectively, so that the resultant field excitation and armature voltage of the alternator vary at varying speed with the tendency to maintain the alternator volts per cycle at a substantially constant value. According to another feature of my invention, the speed responsive field excitation of the regulating generator is caused to follow a predetermined non-proportional dependency on the alternator speed so that the flux is increased at the lower operating speeds in order to compensate for the higher IR drop in the motor circuit.

Figure 1:
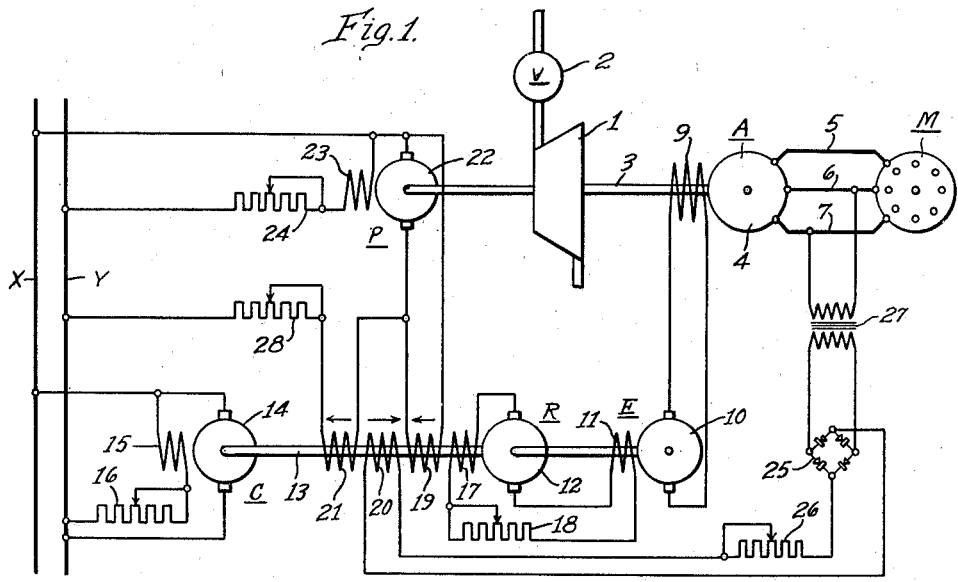
Figure 3:
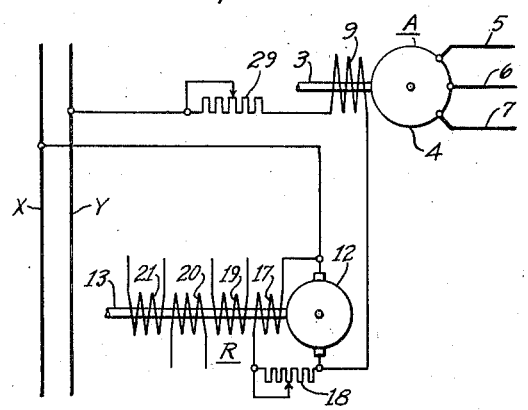
Figure 2:
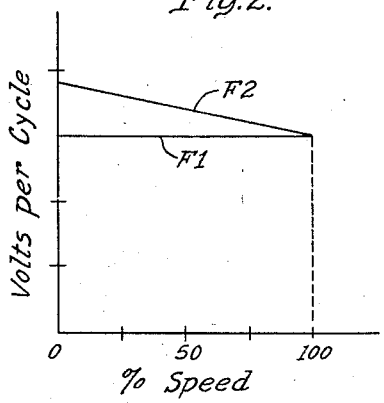

These and other features of my invention will be apparent from the embodiment illustrated in the drawing, in which Fig. 1 shows the circuit diagram of a variable speed drive, and Fig. 2 an explanatory diagram relating to the same drive, while Fig. 3 shows a modification of part of the system of Fig. 1.

The circuit diagram shown in Fig. 1 represents a power system for driving the motor of a machine or plant at variable speeds which are controlled by adjusting the speed of a prime mover. The prime mover is exemplified by a turbine 1 whose speed is regulated by means of an admission valve 2. It will be understood, however, that any other type of prime mover or variable speed drive, for instance a direct-current motor energized from an available direct-current line may be employed instead. The shaft 3 of prime mover 1 is in driving connection with the armature 4 of an alternator A. The output terminals of the alternator are connected through conductors 5, 6, and 7 to the terminals of a synchronous or wound rotor motor M which represents the drive motor of the machine or plant to be operated. The speed of motor M is in accordance with the frequency of the alternating current generated by the alternator A, and this frequency is proportional to the speed of prime mover 1 as selected by means of the speed regulating valve 2.

The alternator has a separately excited field winding 9 whose excitation determines the magnitude of the alternator output voltage. Winding 9 is connected to the armature 10 of an exciter E. This exciter generates a direct-current voltage under control by a separately excited field winding 11 which obtains its excitation from a regulating generator R. The armature 12 of generator R is mounted on a shaft 13 which carries also the exciter armature 10 and is driven by the armature 14 of a constant speed motor C. Motor C is energized from a suitable direct-current source, here represented by buses X and Y. Its field winding 15 is also excited from these buses through a calibrating resistor 16. The control and starting means for motor C may be of any conventional type and are not illustrated in the drawing.

Since during normal operation the speed of armature 10 remains constant, the voltage generated by this armature and imposed on the field winding 9 of alternator A is determined only by the excitation of the exciter field winding 11. This excitation in turn is controlled by the field winding means of the regulating generator R to be described presently.

The generator R has a self-energized field winding 17. The term "self-excited field winding," as used in this specification and the appertaining claims, is understood to refer to a generator field winding whose excitation is supplied or controlled by the electric energy generated in the armature of the same generator. In the embodiment illustrated in Fig. 1, the self-excited field winding 17 is series connected between the armature 12 and the exciter field winding 11, a calibrating resistor 18 being interposed. Field winding 17 has a voltage sustaining function. That is, the loop circuit comprising the regulator armature 12, the self-energizing field winding 17, the resistor 18, and the exciter field winding 11 is so rated that its resistance line coincides substantially with the no-load saturation curve of the regulating generator R. Consequently, the self-energized field of regulator R tends to maintain the voltage of armature 12 at any level determined by the other field windings of the generator without requiring appreciable flux from any of these other field windings. Due to this function of the self-energizing field winding, the regulating generator possesses the ability to amplify small amounts of energy supplied to its control field windings into very large amounts of output energy. This amplifying function is highly sensitive due to the fact that the field winding 17 feeds a small portion of the generator output power back into the generator in the form of excitation, thereby producing still more output.

The other field windings of the generator R comprise two oppositely acting and balanceable windings 19 and 20 and a corrective field winding 21. Field winding 19 is connected to the armature 22 of a pilot generator P driven from the alternator shaft 3. The field winding 23 of the pilot generator is supplied with constant excitation from the direct-current buses X and Y through a calibrating rheostat 24. The excitation of winding 23 remains constant during the operation of the system so that the output voltage impressed on field winding 19 is a measure of the alternator speed or frequency. Field winding 20 of generator R is connected to a full-wave rectifier 25 through a calibrating rheostat 26. The rectifier is energized through a transformer 27 from leads 6 and 7 of the alternator load circuit. The transformer 27 operates with an approximately constant magnetizing current due to the fact that the volts per cycle output of the alternator A vary within narrow limits at different alternator speeds.

Field winding 21 of generator R serves as a compensating field with the effect of increasing the volts per cycle output of the alternator at low operating speeds. Winding 21 is connected with both the pilot exciter P and the direct-current buses so that the resultant voltage across winding 21 represents the differential value of the constant direct-current bus voltage and the variable exciter voltage. The calibrating rheostat 28 is so adjusted that the pilot voltage and bus voltage cancel each other at the rated maximum speed of the alternator. Hence, at this speed the differential voltage across winning 21 is zero. At lower speeds, the voltage supplied by the pilot generator P is reduced, so that the constant bus voltage prevails. As a result, a current is passed through field winding 21 in proportion to the difference in voltage of pilot generator and direct-current bus. Therefore, the field of winding 21 becomes stronger and supports the field of winding 19 as the alternator speed is reduced.

In order to facilitate explaining the operation of the system as a whole, let us assume for the present that the compensating field winding 21 is ineffective. The remaining field windings will then operate to maintain the voltage per cycle output of alternator A at a constant value. In order to obtain this effect, it is necessary to decrease the alternator voltage when the speed and frequency of the alternator is reduced. Field winding 19 of the regulating generator, measuring the operating speed or frequency of the alternator, is balanced against the field of the voltage responsive winding 20 when the volts per cycle value has the correct magnitude. Therefore, the resultant ampere turns of the differentially acting windings 19 and 20 are zero when the load circuit has the desired flux value. Since the self-excited field of winding 17 is just sufficient to sustain the voltage generated in armature 12 and by itself incapable of building up the output of the generator, the control action of the generator is not appreciably affected by the presence of this amplifying winding.

If at any frequency the alternator voltage is too low, the excitation of field winding 20 is proportionately reduced so that the effect of field winding 19 prevails, thereby increasing the resultant excitation of the regulating generator. This, in turn, causes the output voltage of the regulating generator to rise so that the excitation of field winding 11 is increased. This, in turn, causes an increase in exciter voltage and a correspondingly higher field strength and higher output voltage of the alternator. As soon as the increase in alternator voltage reaches the correct value, the two field windings 19 and 20 are again balanced against each other, and the excitation of the regulating generator is maintained at this level by the self-energizing field 17. If the alternator voltage is too high, the reverse operation takes place. If the speed of the alternator is reduced, the output voltage of the pilot generator P declines correspondingly so that the excitation of field winding 19 is automatically calibrated to maintain a voltage proportional to the speed of the pilot generator and thus proportional to the frequency of the alternator. In summary, the system functions with a tendency to maintain a constant volts per cycle value at any speed of the alternator. This tendency is represented by the curve marked F1 in the diagram of Fig. 2.

As explained above, the compensating field winding 21 is ineffective when the alternator operates at 100% rated full speed. Hence, with this speed the flux regulating control function of generator R is determined exclusively by the action of the differential windings 19 and 20 as explained in the foregoing. When the alternator speed is reduced, the correspondingly increased excitation of field winding 21 increases the resultant field strength in generator R in the direction of the speed responsive field winding 19. Consequently, the resultant effect of the two speed responsive windings 19 and 21 is to impose on the regulating generator R an excitation whose dependency on the alternator speed increases more than proportionately toward lower alternator speeds, as is represented by the curve marked F2 in Fig. 2. Thus, the above-mentioned tendency of the regulation to maintain constant volts per cycle is corrected accordingly. This correction is so rated, for instance, by a corresponding adjustment of the rheostat 28, that it compensates for the increased percentile resistance drop (IR drop) of the load circuit including the drive motor M and its connections with the alternator.

It will be understood from the foregoing that the illustrated calibrating rheostats, once properly adjusted, may remain fixed during the normal operation of the system. Consequently, the regulating function of the system is entirely automatic. It will also be recognized that this automatic effect is achieved without the use of interlocking rheostats or other intricate mechanical devices between the variable speed drive and the circuits appertaining to the regulating generator. This renders the control system very simple as compared with arrangements heretofore proposed for related purposes. The absence of delicate regulator mechanisms renders the system sturdy and reduces maintenance requirements to a minimum.

While I have illustrated a series connected self-energizing field winding 17 on regulating generator R, it is obvious that the above described function of this winding can also be obtained by using a shunt field winding in parallel to the regulator armature 12. It will further be understood that in systems with lower power requirements than those of the illustrated drive, the armature circuit of the regulating generator may be directly connected with the field winding 9 of the alternator A under omission of the exciter generator E. According to another possibility, the excitation of the alternator field winding 9 may be provided from the exciter E or regulating generator R in conjunction with a source of constant voltage which is boosted or bucked by the exciter or regulating generator in order to produce the desired control effect on the field winding 9. Modifications of this type are exemplified by Fig. 3.

Fig. 3 shows only the modified part of a control system otherwise designed in accordance with Fig. 1. According to the modified system, the exciter E (Fig. 1) is omitted and the alternator field winding 9 directly connected with the armature 12 of the amplifying regulator generator R. However, the excitation of field winding 9 is mainly derived from the direct current buses X and Y, a rheostat 29 serving to adjust it to the desired value, while the generator R provides merely a corrective regulation by boosting or bucking the excitation dependent upon the above-described control function of the field windings 19, 20 and 21 which is similar to those of the corresponding field windings in Fig. 1 as described above.

In view of such possibilities of modifying or altering the above disclosed system it will be obvious to those skilled in the art that the invention can be reduced to practice by other detail means than those above exemplified, without departing from the gist and essential features of the invention as set forth in the claims appended hereto.

I claim as my invention:

1. An electric power system comprising a variable speed alternator disposed for feeding a load circuit and having a field winding, direct-current exciting means connected to said field winding and including a regulating generator having a voltage-sustaining self-excited field winding free from series connection with said first-named field winding, and also having two mutually opposing and balanceable field windings, circuit means controlled by said alternator and connected to one of said opposing windings for exciting it in dependence upon the alternator frequency, and circuit means controlled by said alternator and connected to said other opposing field winding for exciting it in dependence upon the alternator voltage so as to maintain the volts per cycle of said load circuit at a substantially constant value.

2. An electric power system comprising a variable speed alternator disposed for feeding a load circuit and having a field winding, direct-current exciting means connected to said field winding and including a regulating generator having a single pair of brushes and a self-excited voltage-sustaining field winding connected to said brushes and also having separately excited field winding means, and circuit means controlled by said alternator and connected to said field winding means for exciting them in non-proportional dependency upon the volts per cycle value of said alternator so as to increase said value at reduced alternator speeds.

3. An electric power system comprising a variable speed alternator disposed for feeding a load circuit and having a field winding, direct-current exciting means connected to said field winding and including a regulating generator having separately excited field winding means, speed responsive means controlled by said alternator and connected to said field winding means for providing component excitation therefor in accordance with the alternator frequency, voltage measuring means controlled by said alternator for providing component field excitation for said winding means in opposition to said first component excitation and tending together with said first excitation to maintain a constant volts per cycle value in said load circuit, and circuit means for providing a third component excitation for said winding means in dependence upon the alternator speed so as to increase said value at reduced alternator speeds.

4. An electric power system comprising a variable speed alternator disposed for feeding a load circuit and having a field winding, direct-current exciting means connected to said field winding and including a regulating generator having a self-excited voltage-sustaining field winding, two mutually opposing and balanceable field windings and another field winding, speed responsive circuit means connected to one of said opposing field windings for exciting it in dependence upon the frequency of said alternator, voltage responsive circuit means connected to said second opposing winding for exciting it in dependence upon the voltage of said alternator, and means for exciting said remaining field winding so as to increase the volts per cycle of said circuit at reduced alternator speeds.

5. An electric power system comprising a variable speed alternator disposed for feeding a load circuit and having a field winding, regulating means for exciting said field winding in dependence upon the volts per cycle value of said alternator so as to tend maintaining said value substantially constant, and speed-responsive means controlled by said alternator and connected with said regulating means for correcting its regulating effect in order to increase said value at reduced alternator speeds so as to substantially compensate for increased percentile resistance drop in said load circuit.

6. An electric power system comprising a variable speed alternator disposed for feeding a load circuit and having a field winding, direct-current exciting means connected to said field winding and including a regulating generator having a self-excited voltage-sustaining field winding, two mutually opposing and balanceable field windings and another field winding, speed responsive circuit means connected to one of said opposing field windings for exciting it in dependence upon the frequency of said alternator, voltage responsive circuit means connected to said second opposing winding for exciting it in dependence upon the voltage of said alternator so as to have the tendency, together with said speed responsive circuit means, to maintain the alternator volts per cycle output at a given value, and means controlled in accordance with the alternator speed and connected to said remaining winding for providing it with excitation increasing at decreasing alternator speed for modifying said tendency so as to increase said output at low speed in order to compensate for increased percentile resistance drop in said load circuit.

7. An electric power system comprising a variable speed alternator disposed for feeding a load circuit and having a field winding, direct-current exciting means connected to said field winding and including a regulating generator having separately excited field winding means, and circuit means controlled by said alternator and connected to said field winding means for exciting them in non-proportional dependence upon the volts per cycle output of said alternator so as to increase said output at reduced alternator speeds in order to substantially compensate for increased resistance drop in said load circuit.

8. An electric power system comprising a variable speed alternator disposed for feeding a load circuit and having a field winding, an exciter having an armature connected to said field winding for providing excitation therefor and an exciter field winding for controlling said excitation, a regulating generator having an armature connected to said exciter field winding and being provided with a self-excited field winding and with separately excited field winding means, and circuit means controlled by said alternator and connected to said field winding means for exciting them in non-proportional dependence upon the volts per cycle output of said alternator so as to increase said output at reduced alternator speeds in order to substantially compensate for increased resistance drop in said load circuit.

9. An electric power system comprising a variable speed alternator disposed for feeding a load circuit and having a field winding, an exciter having an armature connected to said field winding for providing excitation therefor and an exciter field winding for controlling said excitation, a regulating generator having an armature connected to said exciter field winding and being provided with a voltage-sustaining self-excited field winding, two mutually opposing and balanceable field windings and another field winding, speed responsive circuit means connected to one of said opposing field windings for exciting it in dependence upon the frequency of said alternator, voltage responsive circuit means connected to said second opposing winding for exciting it in dependence upon the voltage of said alternator, and means for exciting said remaining field winding so as to increase the volts per cycle of said circuit at reduced alternator speeds.

10. An electric power system comprising a variable speed alternator disposed for feeding a load circuit and having a field winding, direct-current exciting means connected to said field winding and including a regulating generator having two mutually differential field windings and another field winding, a pilot generator controlled by said alternator and connected to one of said differential field windings for exciting it in accordance with the alternator frequency, a transformer disposed between said circuit and said other differential winding for exciting the latter in accordance with the alternator voltage, and means connected to said remaining field winding for exciting it so as to increase the volts per cycle of said circuit at reduced alternator speeds.

11. An electric power system comprising a variable speed alternator disposed for feeding a load circuit and having a field winding, direct-current exciting means connected to said field winding and including a regulating generator having a self-excited voltage-sustaining field winding and separately excited field winding means, providing component excitation therefor in accordance with the alternator frequency, voltage measuring means controlled by said alternator for providing component field excitation for said winding means in opposition to said first component excitation and tending together with said first excitation to maintain a constant volts per cycle value in said load circuit, and circuit means disposed for providing a third component excitation for said winding means in dependence upon the alternator speed and comprsing a pilot generator controlled by said alternator so as to produce a variable voltage substantially proportional to the alternator speed and means for bucking said voltage by a substantially constant voltage so that said third component excitation increases at decreasing alternator speeds.

WALTER R. HARRIS.

REFERENCES CITED

The following references are of record in the file of this patent:

UNITED STATES PATENTS

| Number | Name | Date |
|---|---|---|
| 2,285,195 | Edwards | June 2, 1942 |
| 2,298,134 | Kilgore et al. | Oct. 6, 1942 |
| 2,338,498 | Edwards | Jan. 4, 1944 |